United States Patent [19]

Sheldon

[11] 4,209,182
[45] Jun. 24, 1980

[54] BIT RETAINER FOR SCREWDRIVER

[75] Inventor: Gordon P. Sheldon, West Olive, Mich.

[73] Assignee: Cooper Industries, Inc., Houston, Tex.

[21] Appl. No.: 948,719

[22] Filed: Oct. 5, 1978

[51] Int. Cl.² .................................... B23B 31/22
[52] U.S. Cl. ............................. 279/75; 279/1 B; 279/30
[58] Field of Search ............. 279/1 B, 30, 75, 82, 279/47, 48, 49, 51, 19, 19.4, 74, 80, 29

[56] References Cited
U.S. PATENT DOCUMENTS

| | | |
|---|---|---|
| 2,008,894 | 7/1935 | Bergstrom .................. 279/82 X |
| 2,010,210 | 8/1935 | Witt ............................ 279/82 |

*Primary Examiner*—Z. R. Bilinsky
*Attorney, Agent, or Firm*—Michael E. Martin

[57] ABSTRACT

An axially movable sleeve is retained in a bore in the nose portion of a portable rotary tool housing. The sleeve is disposed around a spindle and holds captive a ball key disposed in the spindle which releasably retains a screw driver bit or the like in the spindle bore or socket. The sleeve is releasably retained in the housing bore by a spring retainer whereby the bit as well as the retainer sleeve may be quickly removed and replaced by axial displacement of the sleeve.

7 Claims, 2 Drawing Figures

BIT RETAINER FOR SCREWDRIVER

BACKGROUND OF THE INVENTION

In the art of portable rotary power tools such as screw drivers and the like it is conventional practice to provide for a variety of nose portions of the tool housing which are removable from the main housing member and which are each adapted to mount a specific type of bit retaining device, namely, the conventional slip chuck for screw driver bits or wrench socket drivers, a screw finder and bit assembly, and special screw holding devices in combination with a rotary bit. Accordingly, it has heretofore been necessary to not only have available the various bit and fastener holding devices, but also special housing portions specifically adapted to mount the respective devices used with rotary screw drivers. Such arrangements are expensive and require that additional housing nose portions be used for each type of bit, bit driver, or screw holding device.

SUMMARY OF THE INVENTION

The present invention provides for an improved retainer for bits and the like for portable rotary power tools such as pneumatic screw drivers.

The bit retainer of the present invention not only provides for quick release of the bit or driver from the tool drive spindle when it is desired to replace the bit with one of a different style or size, but the bit retainer itself may be quickly and easily removed from the tool housing whereby other driving and screw holding devices may be interchangeably inserted in the housing itself.

The bit retainer of the present invention is also adapted to be axially movable at will for quick removal and insertion of a bit or socket driver with respect to a rotary drive spindle of a pneumatic screw driver or the like. Moreover, the bit retainer is not connected to the spindle for rotation therewith. Accordingly, the rotating mass of the driven parts of the tool is maintained at a minimum for better torque control and reduced reaction forces.

The bit retainer of the present invention is not only inexpensive in itself, but provides for a reduced number of parts required for converting a tool for use with bit and screw finder and holder combinations of various types as well as use of the tool with socket type screw driving members.

DESCRIPTION OF THE PREFERRED EMBODIMENT

Figure 1:
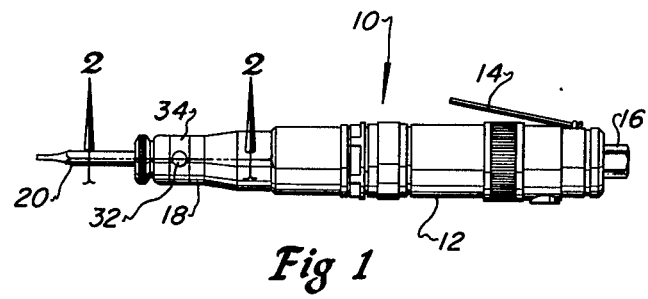
FIG. 1 is a side elevation of a portable hand-held pneumatic screw driver including the bit retainer of the present invention.

Referring to FIG. 1 of the drawing a power tool comprising a hand-held pneumatic screwdriver is generally designated by the numeral 10. The tool 10 is of the conventional in-line type including a housing 12 and an actuating lever 14 for controlling the supply of motive fluid to a motor, not shown, disposed in the housing. A fitting 16 is also mounted on the housing 12 for connecting the tool to a source of motive fluid such as compressed air. The tool housing 12 includes a nose portion 18 which may be releasably secured to the remainder of the housing by complementary threaded portions on the respective parts in accordance with known practice. A screw driver bit 20 is releasably retained in the nose portion 18 of the tool by an improved tool retainer according to the present invention.

Figure 2:
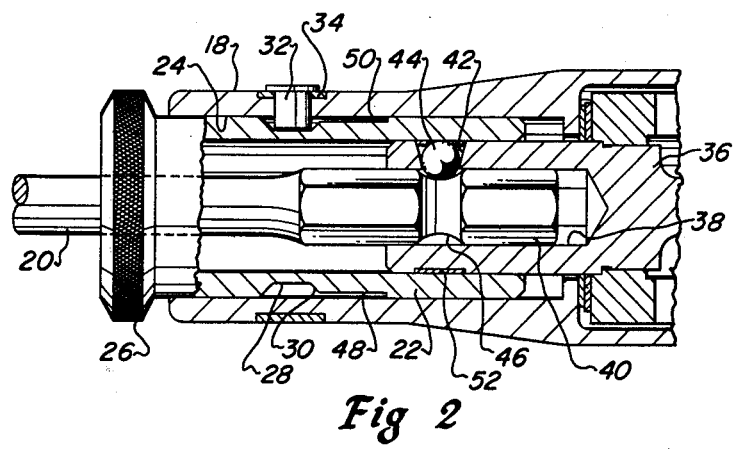
FIG. 2 is a longitudinal section view of the nose portion of the tool illustrated in FIG. 1 showing structural details of the bit retaining and driving means.

Referring to FIG. 2 the bit retainer of the present invention includes a tubular sleeve 22 axially slidably disposed in a bore 24 in the nose portion 18. The sleeve 22 includes an integral knurled collar 26 which is formed on the distal end of the sleeve and is used for insertion and removal of the sleeve with respect to the bore 24. An annular recess 28 including a sloping side wall 30 is formed in the outer peripheral surface of sleeve 22. A key 32 fixed to an annular split ring 34 is disposed on the nose portion 18 and protrudes into the recess 28 to retain the sleeve 22 in the position relative to the nose portion as shown in FIG. 2. The exertion of a moderate axial force on the sleeve 22 will cause the key 32 to be displaced radially outwardly to permit the sleeve to be inserted in or removed from the bore 24. The split ring 34 is preferably made of a resilient material such as spring steel and is formed to bias the key in the position shown in FIG. 2.

The sleeve 22 is also formed to fit closely around the outer diameter of a rotatable drive spindle 36 which is drivenly connected to the tool motor. The spindle 36 includes a longitudinal socket 38 which is shaped to receive the shank 40 of the bit 20 for rotatably driving the bit in response to rotation of the spindle. The spindle 36 also includes a transverse tapered bore 42 intersecting the socket 38 and in which is disposed a ball key 44 which, as shown in FIG. 2, projects into a circumferential groove 46 in the bit shank for retaining the bit in the socket.

When it is desired to remove the bit 20 from the tool 10 the operator needs to merely grasp the collar 26 and move the sleeve 22 axially out of the bore 24 thereby forcing the key 32 to be displaced out of the recess 28 and along a second recess formed by the reduced outer circumference 48 of the sleeve until the key abuts the shoulder 50. In such a position of the sleeve the bore 42 is uncovered and the ball key 44 may be displaced radially outwardly sufficiently to permit removal of the bit. The ball key 44 is prevented from being completely displaced from the bore 42 in the radially inward direction by the taper of the bore and the ball key is biased against being displaced radially outwardly by a circular band spring 52 disposed in a circumferential groove in the spindle. However, the outer diameters of the spindle 36 and the diameter of the bore 24 may be proportioned in such a way that the width of the annular space therebetween is insufficient to allow the ball key 44 to be displaced entirely out of the bore 42. The band spring 52 could thus be eliminated in such an arrangement. If it is desired to completely remove the sleeve 22 from the bore 24 the key 32 is merely lifted further outwardly so that it is clear of the shoulder 50. Normally the sleeve 22 may be removed from the bore 24 by applying a somewhat greater axial force on the collar 26 than would be required to move the sleeve for replacing or interchanging a tool bit so that the key 32 is forced radially outwardly by the shoulder 50.

The arrangement of the bit retaining sleeve 22 in combination with the housing nose portion 18 provides for an improved tool holding device which may be easily and quickly interchanged with combinations of bits and screw finder sleeves which fit in the bore 24 of the housing as well. Accordingly, the housing itself does not need to be changed whenever a different bit or drive mechanism is connected to the spindle. Moreover, the relatively large internal bore of the sleeve 22 permits the sleeve to be used as a retainer for various types of bits and drivers for wrench sockets and the like.

I claim:

1. In a portable power tool in combination:
   a housing including a nose portion having an axial bore opening to one end thereof;
   a rotary spindle disposed in said bore and forming an annular space between the cylindrical wall of said nose portion forming said bore and said spindle, said spindle including a socket for receiving the shank of a bit or the like;
   a bit retaining key disposed on said spindle and operable to be in a position projecting into said socket for retaining a bit therein, said bit retaining key being operable to be displaced from said socket into said annular space to release a bit from said spindle;
   an elongated tubular sleeve removably disposed in said bore in close fitting relationship to said cylindrical wall and being operable to occupy at least a portion of said annular space so as to prevent said bit retaining key from being displaced from said socket;
   a sleeve retaining key disposed on said nose portion and projecting into said bore for releasably retaining said sleeve in said bore, said sleeve retaining key being biased into engagement with said sleeve by spring means disposed on said nose portion; and,
   means associated with said sleeve and projecting from said bore at said one end of said nose portion for moving said sleeve axially to allow said bit retaining key to be displaced into said annular space to release a bit disposed in said socket.

2. The invention set forth in claim 1 wherein:
   said sleeve includes a first recess in the cylindrical outer wall surface thereof in which said sleeve retaining key may be disposed to hold said sleeve in a position in said bore which will prevent displacement of said bit retaining key from said socket.

3. The invention set forth in claim 2 wherein:
   said sleeve includes a second recess adjacent to said first recess and including a shoulder engageable with said sleeve retaining key whereby said sleeve may be moved axially in said bore to engage said sleeve retaining key with said shoulder to allow said bit retaining key to be displaced from said socket.

4. In a portable power tool in combination:
   a housing including a nose portion having an axial bore opening to one end thereof;
   a rotary spindle disposed in said bore and forming an annular space between the cylindrical wall of said nose portion forming said bore and said spindle, said spindle including a socket for receiving the shank of a bit or the like;
   a bit retaining key disposed on said spindle and operable to be in a position projecting into said socket for retaining a bit therein, said bit retaining key being operable to be displaced from said socket into said annular space to release a bit from said spindle;
   an elongated tubular sleeve removably disposed in said bore in close fitting relationship to said cylindrical wall and being operable to occupy at least a portion of said annular space so as to prevent said bit retaining key from being displaced from said socket;
   a sleeve retaining key disposed on said nose portion and projecting into said bore for releasably retaining said sleeve in said bore, said sleeve retaining key being biased into engagement with said sleeve by spring means disposed on said nose portion; and,
   means including an integral collar disposed on one end of said sleeve and projecting from said bore at said one end of said nose portion for moving said sleeve axially to allow said bit retaining key to be displaced into said annular space to release a bit disposed in said socket.

5. In a portable power tool in combination:
   a housing including a nose portion having an axial bore opening to one end thereof;
   a rotary spindle disposed in said bore and forming an annular space between the cylindrical wall of said nose portion forming said bore and said spindle, said spindle including a socket for receiving the shank of a bit or the like;
   a bit retaining key disposed on said spindle and operable to be in a position projecting into said socket for retaining a bit therein, said bit retaining key being operable to be displaced from said socket into said annular space to release a bit from said spindle;
   an elongated tubular sleeve removably disposed in said bore in close fitting relationship to said cylindrical wall and being operable to occupy at least a portion of said annular space so as to prevent said bit retaining key from being displaced from said socket;
   a sleeve retaining key disposed on said nose portion and adapted to be resiliently biased into engagement with said sleeve for retaining said sleeve in said bore; and,
   means associated with said sleeve and projecting from said bore at said one end of said nose portion for moving said sleeve axially to allow said bit retaining key to be displaced into said annular space to release a bit disposed in said socket.

6. The invention set forth in claim 5 wherein:
   said means associated with said sleeve includes an integral collar disposed on the end of said sleeve projecting from said bore.

7. The invention set forth in claim 5 wherein:
   said bit retaining key is a spherical member, and the width of said annular space is less than the diameter of said spherical member whereby said spherical member is prevented from being displaced radially outwardly out of engagement with said spindle.

* * * * *